June 21, 1938.  E. S. CORNELL, JR  2,121,754
DEFROSTER
Filed Feb. 1, 1936  2 Sheets-Sheet 2
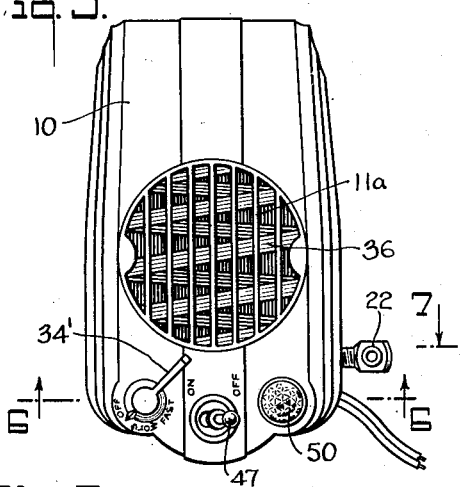
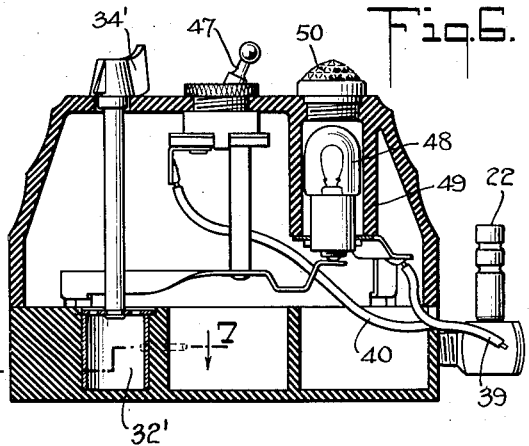
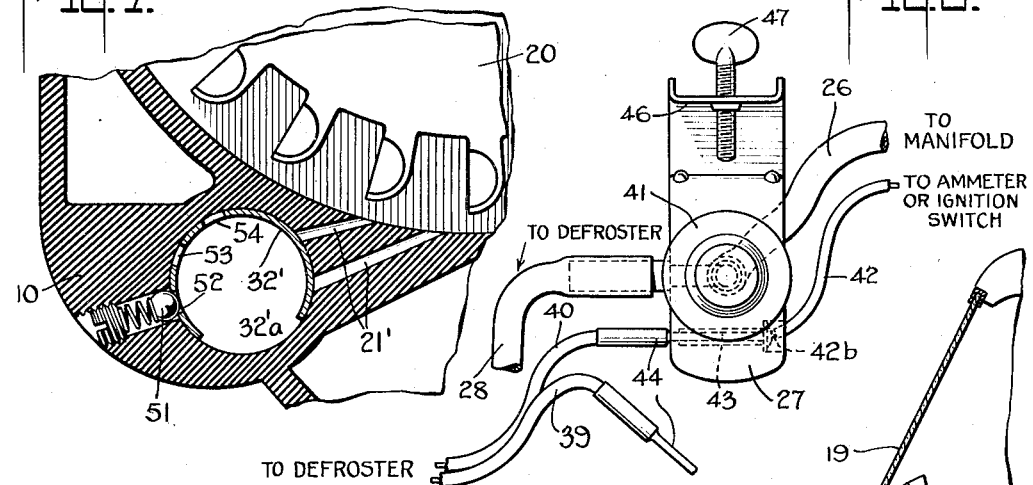
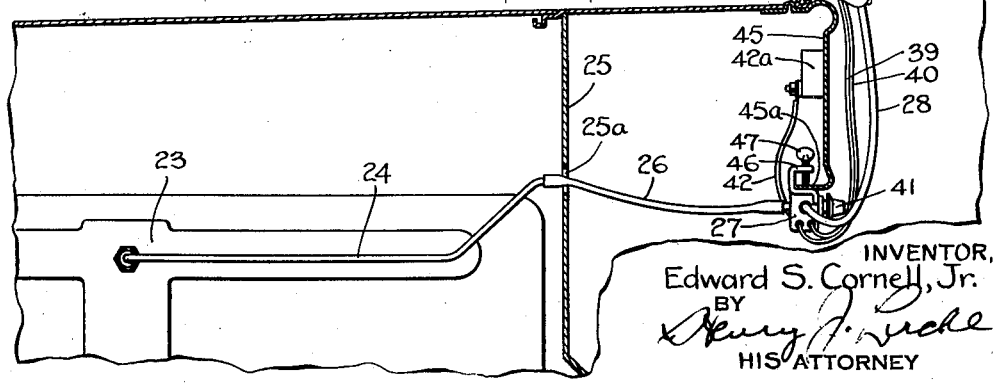
INVENTOR,
Edward S. Cornell, Jr.
BY
HIS ATTORNEY Patented June 21, 1938

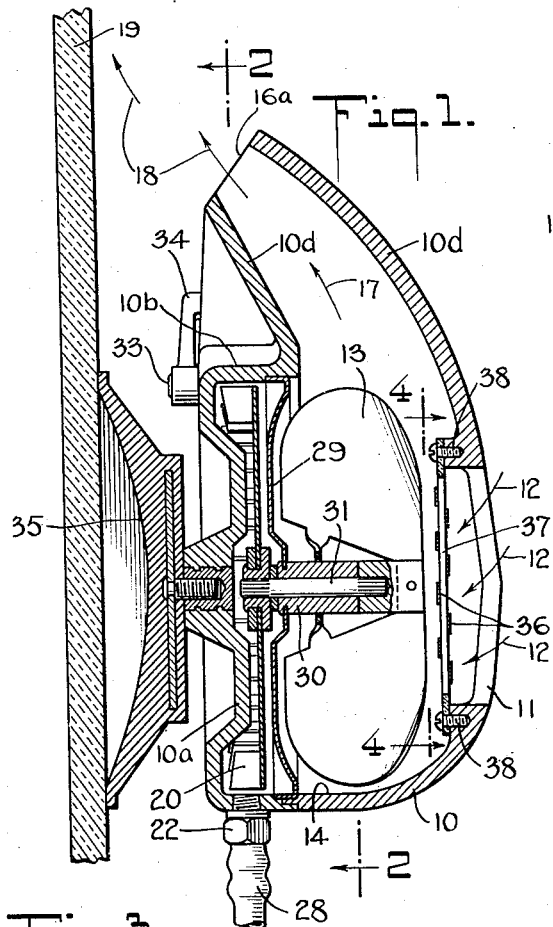

2,121,754

UNITED STATES PATENT OFFICE 2,121,754

DEFROSTER

Edward S. Cornell, Jr., Larchmont, N. Y., assignor to American Radiator Company, New York, N. Y., a corporation of New Jersey Application February 1, 1936, Serial No. 61,850

2 Claims. (Cl. 20—40.5)

The invention relates to window defrosters.

My present invention is a developed embodiment of the generic features and operation of my defroster set forth and claimed in my co-pending application Serial No. 42,374, filed September 27, 1935, entitled Window defrosters.

My present invention, similar to my above referred to invention, is generically directed to unitary means for removing from glass vapor, frost, and/or other condensation. By the term "glass" I include the glass constituting the windshield of an automobile, the glass of a door of an automobile or other form of self-propelled vehicle, and the like. By the term "frost" and its derivatives, I include the above and other varied forms of condensation, usually tending to obscure vision.

Commercial embodiments of my present invention are represented by unitary devices, each comprising an apertured member constructed to receive and transmit air under compression and discharge the same in predetermined path of flow, an air compressor, a motor for actuating the compressor and casing means for housing the stated parts, the casing means including or arranged for coordination with suitable means for attaching and/or supporting the stated assembly as a unit relative to the surface of the glass to be treated.

Desirably, for use with an automobile employing an internal combustion engine as its tractive motor, the motor of my defroster may be of the air propelled type, advantageously operated under sub-atmospheric pressure by connection through suitable tube means with the intake manifold of the tractive motor. However the motor of my defroster may be operated by compressed air from any suitable source, or may be electrically driven by energy from the storage battery or other electrical source, or otherwise suitably energized. Advantageously, the compressor is of the rotary type, thereby attaining simplification of structure with attendant reduced overall dimensions and also efficiency of operation by a rotary type of motor. The compressed air may be heated as by means of a suitable heating element, in its transit through the defroster. Such heating element may be of the electrical type, energized by the storage battery or other suitable electrical source, or heated by heat exchange relation with the heated gases of the exhaust of the tractive motor, or in any other suitable manner.

My present invention is particularly directed to a unitary assembly of the stated essential points, whereby the over-all dimensions are reduced, and such linear reduction utilized in attaining superior operation and efficiency. Such reduction of linear dimensions affords the advantage of reduced area of the face of the glass of the windshield obscured by the defroster when the defroster is positioned directly upon the windshield, and further permits the defroster to be located upon the windshield at a position as close to the area of normal sight through the windshield as may be preferred by the operator of the automobile or other vehicle.

Further, by my present invention, afforded by its reduced linear dimensions and for effective relation of its parts, the zone of the compressed air projected by the defroster is reduced and located in immediate proximity to the plane of the windshield, whereby increased effective pressure of the air of such zone of projection at a given rate of operation of the actuating motor and/or given consumption of electrical or other energy supplied to the heating element is attained.

Such superior arrangement and operation, as substantiated by tests under commercial conditions, attain the ideal desideratum of rapid and maintained removal of sleet and/or snow from the exterior face of a windshield, under extreme unfavorable exterior atmospheric conditions, by installation of my defroster at or upon the interior face of the windshield.

Further features and objects of my invention will be more fully understood from the following detail description and the accompanying drawings, in which Fig. 1 is a central sectional view of a preferred embodiment of my invention. This view also shows in sectional elevation a pane of glass, such as a windshield, upon one face of which my defroster is positioned.

Fig. 2 is a sectional view on line 2—2 of Fig. 1, a portion being broken away to reveal otherwise hidden parts.

Fig. 3 is a front elevation of Figs. 1 and 2.

Fig. 4 is a detail sectional view on line 4—4 of Fig. 1, showing an electrical heater element.

Fig. 5 is an elevation of a refined commercial embodiment of my defroster.

Fig. 6 is a sectional view on line 6—6 of Fig. 5, on a somewhat enlarged scale.

Fig. 7 is a detail sectional view on line 7—7 of Fig. 6, on a further enlarged scale.

Fig. 8 is an elevation of a junction member advantageous for affording permanent installation of a portion of my defroster system, while permitting the defroster per se and its immediately connected parts to be detached and stored.

Fig. 9 is a diagrammatic view, in side elevation, showing a manner of hook-up of my defroster system, the defroster being equipped with an air motor operated under sub-atmospheric pressure by piping connection with the inlet manifold of the tractive motor.

Referring to the preferred embodiments of the invention illustrated in the drawings, the defroster per se comprises in essence a housing 10 provided with a suitably apertured and suitably located opening 11, providing for the ingress of air,—indicated by the arrows 12,—a compressor enclosed in the housing 10, and including a compressor blade 13 disposed within a suitable compartment 14, formed as a portion of the interior of the housing 10. Such compartment 14 has a suitable egress opening 15 leading to the channel 16, suitably dimensioned and correlated to receive and transmit—see arrow 17—air under compression delivered by the compressor and to project such compressed air through its discharge opening 16a, indicated by the arrows 18, pursuant to the objectives of my invention, in suitable relation to the glass of a windshield, or the like.

Pursuant to the illustrated embodiments of my invention, and advantageous in an automobile, aeroplane, or other vehicle employing an internal combustion engine as the tractive or propelling motor, the compressor is shown actuated by an air motor, which may comprise the structural and functional features of my air motor described and claimed in my U. S. Patents Nos. 1,926,529 and 1,926,528, patented September 12, 1933, No. 2,013,087, patented September 3, 1935.

Such form of air motor may be, and preferably is, unitarily embodied in such housing 10, the rotor of such motor being shown at 20, its inflow opening through a passage 21 and its outflow nipple at 22. In such type of installation suitable piping connection is had with the inlet manifold of the tractive engine, indicated at 23, see Fig. 9. As shown in Fig. 9, such piping may include tubing 24, desirably of metal or other heat and oil resisting material, extending through the hood compartment to the dash, indicated at 25, and connected to the tubing 26, which may be of rubber or the like if desired. Advantageously, such tubing 26 leads to a junction device 27, described more fully hereinafter, and eventually through the tubing 28, which may be of rubber or the like, to the outflow nipple 22, see Figs. 1 and 2, of the air motor.

Effectively, and as shown, the rear wall 10a serves to house the air rotor 20, such rear wall 10a being correspondingly contoured; the opposite wall of the air motor housing is shown constituted of a suitably contoured cylindrical disc 29, received within the reduced, cylindrically recessed portion 10b of the unitary housing. Such intermediate wall, i. e., the disc 29, serves also for support of a bearing 30, rotatably supporting the shaft 31 of the air rotor 20, which shaft 31 dually serves as the shaft for the compressor blade 13.

Suitable control of the rate of operation of the compressor, is shown in the form of a control of the rate of operation of its actuating motor, in this instance an air motor, the control being shown at the inflow opening 21 of such motor. Such control, as shown, comprises a movable valve member 32, mounted on a shaft 33, and operated by a finger piece 34. Such finger piece desirably has a free end 34a, enlarged laterally to thereby afford a lug-like lateral formation serving, in conjunction with the face 10c, see Fig. 2, of the housing 10, to limit the range of movement of the fingerpiece 34, in its setting of effective extent of opening of the inflow opening 21.

The movable valve member 32 is shown of the through bore type, its bore being indicated at 32a. The valve 32 is shown in Fig. 2 in its fully open position.

As appears from Fig. 1, the stated unitary structure of my defroster, may be removably installed relative to the glass 19 of a windshield of an automobile or the like. Such removable installation is conveniently had by the employment of a suction cup support, see 35, Fig. 1, wherein the defroster is shown supported by such suction cup 35 directly upon a face of the windshield glass 19.

The ingress opening 11 of the housing 10 may, as shown, be provided by a set of spaced parallely extending strips 11a; such arrangement provides for ornamentation and also protects against accidental or unauthorized access to rotating parts and/or the "live" electrical resistance while in operation.

The air projected by the defroster is desirably heated; such heating may be had by any suitable means. Preferably, the heating means is incorporated unitarily with the defroster per se, as by, utilizing electrical heating means, mounting the same, i. e., an electrical resistance element 36, see Figs. 1, 2 and 4, insulatedly upon a frame 37, which frame may be secured, as by screws 38, at the inflow opening 11 of the housing 10. Such frame 37, and its thereby supported electrical resistance 36, forms a grille-like structure through the meshes of which permeates the air induced by the propeller 13 of the compressor, whereby such air is brought into direct heating exchange relation with the heated electrical resistance. The conductors connected to the respective terminals of the electrical resistance 36, are indicated at 39 and 40.

In such removable form of installation of the defroster, it is advantageous to provide for the storing of the defroster per se while maintaining permanent piping connection with the inlet manifold of the tractive motor. Such arrangement is conveniently had by the provision of a junction device, see Figs. 8 and 9, providing inter alia for support of one end of the piping 26, leading toward the intake manifold, and a valve 41 for closing the end of the pipe 26—when the defroster is not in use—to shut off needless inflow of air into the inlet manifold of the combustion engine.

Such junction device 27 may serve correspondingly for the reception and support of the free ends of the electrical conductors leading from the storage battery or other source of energy of the heating element. The cable 42 represents such conductors which may be connected to the respective terminals of the ammeter or of the ignition switch, indicated at 42a, of the automobile, in lieu of direct connection with the terminals of the storage battery, the free ends of such conductors, indicated at 42b, in Fig. 8, being respectively received in, and supported by, tubular electrical contacts, indicated at 43. Such tubular electrical contacts 43, at their opposite ends, are adapted to receive the metallic tips 44 of the respective conductors 39, 40, see Figs. 4; 9, leading to the terminals of the electrical resistance 36, as set out hereinabove.

Such junction device 27 is conveniently installed in association with the panel board 45 of the automobile, or with the instrument board of an aeroplane, or similarly in any other vehicle, as by the provision of a clamping bracket, the bracket being indicated at 46 and its clamping screw at 47, whereby, as illustrated in Fig. 9, the junction device 27 may be installed in alignment with the exposed face of such panel board 45, or equivalent, by suspension from its usual inwardly horizontally extending lower flange 45a. By such installation, the operating knob of the shut-off valve 41 is positioned within ready and convenient reach of the operator of the automobile or other vehicle.

The valve 41 of the junction device 27 may be of any suitable type. As indicated in the drawings, the valve 41 may be of the needle type, set to fully closed position by, say, clockwise rotation, and through partial (or intermediate) to full opening by counter-clockwise rotation of its knob 41.

Figs. 5, 6 and 7 illustrate a refined, commercial embodiment of my invention, comprising the above set out essentials of my invention, and incorporating accessories for convenience, the assembly being designed for ornamentation as well as utility; like parts are indicated by like reference characters.

The control of the rate of operation of the compressor, i. e., by corresponding control of the air motor, is shown in Figs. 5 and 6, in the form of a finger piece 34', located at the front of the housing 10. The finger piece 34' is shown in Fig. 5 in its "off" position. By movement of the finger piece 34', say, counter-clockwise, the regulating valve at the intake opening of the air motor is gradually opened, through "slow", (i. e., intermediate) and thence to "fast" (i. e., full), suitable limiting means being provided. The stated "off", "slow", "fast", or equivalent, indications may be suitably affixed with reference to the pointer of the manipulating piece 34'.

Desirably the housing 10 is formed of mouldable material, such as synthetic resins, so-termed bakelite, or the like.

Also, for convenience, the electrical switch of the heating element may be mounted on and unitarily combined with the defroster per se. An electrical switch is indicated at 47, of the tumbler type, its "on" and "off" positions being designated by the stated or corresponding indications applied upon or moulded in the material of the wall of the defroster. Also, for convenience, means are provided, and as shown in Figs. 5 and 6, unitarily incorporated in the defroster per se, for visual showing "on" and "off" of the electrical current, passing through the heating resistance 36. Such visual or equivalent indicating means is conveniently had, see Fig. 6, by connecting a miniature electrical lamp 48 in the circuit of the leads 39, 40, and suitably located, as in a cylindrically formed compartment 49, the outer end of which is "closed" by a button 50, say, of colored glass, whereby, upon closing of the electrical circuit, the lamp 48, or equivalent is lighted, and definite visual indication is given by the lamp "button" 50, or equivalent. In the use of an inlet manifold, or equivalent operation of the defroster, automatically or concomitantly with the tractive or propelling motor, upon cessation of the latter, the defroster automatically ceases operation, independently of the control 34 or 34' of the defroster and independently of the shut-off valve 41 of the junction device 27.

Fig. 7 illustrates a form of control of the speed of operation of the air motor. In the arrangement shown in Fig. 7, two inflow passages 21', serve as the inflow leading to the interior of the air motor, such inflow openings, being respectively axially directed at dual cooperating angles to the buckets of the air rotor 20, to afford effective actuation of the rotor, at "slow", and enhanced high speed at "fast", the flow of air through the "slow" opening, shown of larger bore in Fig. 7, and through both openings at "fast", control of air flow is had by a hollow valve member 32' having an arcuate valve opening 32'a. Preferably, and as shown, the valve member 32' is provided with position setting means, shown in the form of a spring biased ball 51, cooperating with the recesses 52, 53, 54, respectively corresponding to "off", "slow", "fast". The supply of air to the interior of the movable valve member 31' may be had as desired, either by direct opening communicating with the outer atmosphere, or by distributed openings afforded by the normal clearances in the assembly of the component parts of the housing, the latter being effective to afford distribution of air flow in the operation of the air rotor, functioning as a quasi-filter of dust and other foreign material, etc.

By the relationship of the essential parts of my defroster, represented by the illustrated embodiments herein, the over-all and in particular the length of the defroster, per se, are greatly reduced and the effectiveness of operation enhanced. By the present invention, the channel is constructed of reduced effective length and of graduated cubical capacity at its successive cross-sections to receive and transmit the air under compression delivered by the compressor, and arranged and constructed at its discharge opening to project such compressed air over a flatwise path of flow, and in direction more and more toward the plane of the glass to be defrosted, the longer dimension of such flat-wise path of the compressed air at the instance of discharge being substantially parallel to the plane of the glass.

Further, the provision of conduction of the air under compression through the channel means and the attainment of optimum angle of attack of the projected air delivered through the discharge opening of the channel, is enhanced by the curved formation of the channel means adjacent and at its discharge opening, see walls 10d, 10d, of the housing, Fig. 1, thereby providing for convergent tapering of the channel means toward and to its discharge opening, and the positive guidance of the ultimately projected air discharge, as to optimum range of angle of attack of the projected compressed air, heated or unheated, and the resulting range of zone of air flow at and over the area of the face of the glass defrosted and in return to the inflow opening 11 of the defroster.

Further, by disposing the air motor at the rear wall of the housing, at which rear wall the suction-cup support is exteriorly secured, the over-all dimension of the housing per se is reduced.

Minimal cross-section of the unitary assembly parallel to the plane of the glass of the windshield, coupled with optimum efficiency is had, as shown in the illustrated embodiments, by forming the major portion of the front wall of the housing convexly arcuate in direction transverse to the general direction of flow of air through the housing and merging therewith a wall portion arcuate in direction extending toward the glass, the latter arcuate wall portion dually serving as a convergently tapered wall of the channel means. By such or equivalent structure, the zone of the path of the released compressed air to and at the area to be defrosted and the path of return flow of the air to the ingress opening 11 of the housing is definitely reduced, thereby enhancing the effectiveness of the air flow in defrosting function, as well as minimizing the area of the plane of the glass occupied by the defroster, and affording improved visibility to the operator in the operation of the vehicle.

Whereas, I have described my invention by reference to specific forms thereof, it will be understood that many changes and modifications may be made without departing from the spirit of the invention.

I claim:—

1. In a defroster possessing minimum visibility obstructing dimensions, the combination of a housing, an air compressor mounted in said housing, said housing being provided at one side with an air ingress opening leading to the portion of said housing in which said air compressor is located, channel means formed in said housing communicating with the delivery of said air compressor, said channel means being constructed to transmit the delivered air under compression, the walls of said channel means converging transversely longitudinally of the respective directions of extension of said channel means in the direction of air flow therethrough, and means for supporting said housing upon a glass device to position the axis of the discharge of the housing at an acute angle to the plane of the glass device, whereby the stated convergent wall formation of said channel means minimizes the visibility obstructing dimensions of the defroster and dually maintains compression of the conveyed compressed air.

2. In a defroster possessing minimum visibility obstructing dimensions, the combination of a housing, means for supporting said housing upon a glass device, the wall of said housing on its side remote from the glass device being convex with respect to the glass device, channel means formed in said housing and including said convex wall of the housing, an air compressor mounted in said housing, a motor for actuating said air compressor, said motor being wholly disposed within said casing, said housing being provided on one side with an air ingress opening leading to said air compressor, the walls of said channel means including said convex side of the housing converging in the direction of air flow therethrough, said channel means having a discharge opening disposed at an acute angle to the plane of the glass device.

EDWARD S. CORNELL, Jr.